US00RE34766E

United States Patent [19]

Merz et al.

[11] E Patent Number: Re. 34,766

[45] Reissued Date of Patent: Oct. 25, 1994

[54] LAMINATING AND COATING ADHESIVE, ITS MANUFACTURING AND USE

[75] Inventors: Ekkehard Merz; Robert Singer, both of Burghausen, Fed. Rep. of Germany

[73] Assignee: Wacker-Chemie GmbH, Fed. Rep. of Germany

[21] Appl. No.: 696,189

[22] Filed: May 6, 1991

[51] Int. Cl.[5] ..... B05C 3/02; C09J 3/16

[52] U.S. Cl. ..... 156/326; 156/330; 156/330.1; 427/207.1; 427/386; 523/409; 523/411; 523/416

[58] Field of Search ..... 156/326, 330, 330.9; 427/207.1, 386; 523/409, 411, 412

[56] References Cited

U.S. PATENT DOCUMENTS

| | | | |
|---|---|---|---|
| 2,784,128 | 3/1957 | Schroeder | 523/409 X |
| 3,812,070 | 5/1974 | Kelley | 523/412 |
| 4,077,932 | 3/1978 | Columbus | 260/29.6 X |
| 4,108,819 | 8/1978 | Oyamada et al. | 260/29.6 |
| 4,151,148 | 4/1979 | Chasin et al. | 260/29.6 X |

OTHER PUBLICATIONS

Chemical Abstracts 87 (1977) 40,402k.

*Primary Examiner*—Michael Lusignan
*Attorney, Agent, or Firm*—Bierman and Muserlian

[57] ABSTRACT

A laminating and coating adhesive based on an aqueous dispersion of (1) a copolymer of a vinyl ester, and/or an acrylic acid ester, and/or a further monomer and an ethylenically-unsaturated functional group-containing monomer having from 3 to 18 carbon atoms and hydroxy and carbonyl groups as functional groups, such as a monocarboxylic acid or dicarboxylic acid and/or N-methylol-(meth)-acrylamide, (2) an epoxy compound, and (3) an amine hardener.

The adhesive gives a laminate bond with especially high resistance to peeling even in the case of thermal stress and/or in the presence of water.

11 Claims, No Drawings

LAMINATING AND COATING ADHESIVE, ITS MANUFACTURING AND USE

Matter enclosed in heavy brackets [ ] appears in the original patent but forms no part of this reissue specification; matter printed in italics indicates the additions made by reissue.

BACKGROUND OF THE INVENTION

A problem that frequently arises in the packaging industry is that of producing a packaging material consisting of more than one layer, for example, coating cardboard or paper with plastics film to provide mechanical protection, or laminating two or more sheets together in order to prevent, for example, permeability to gas and/or liquid.

In many cases welding techniques or solvent-containing adhesives have previously been used for those purposes. It is not necessary to go into detail here about the disadvantages of surface welding and equally, quite apart from the economic disadvantages, there are evident problems in the use of solvent-containing adhesives as regards environmental pollution, work place sanitation and the fire risk.

To avoid those disadvantages, an adhesive that is said to solve these problems was proposed in Japanese Published Application JP-OS No. 77/42532 (according to a review in Chemical Abstracts 87 [1977] 40 402 k). The adhesive used in that case consists of an aqueous dispersion of an ethylene/vinylacetate copolymer (PEVAC), into which 5% to 30% by weight of epoxy resins, based on the PEVAC content, have been incorporated, and to which an amine hardener has been added.

The adhesive was produced, for example, by dissolving a mixture of an aqueous solution of protective colloids and sodium acetate with epoxy resin in vinyl acetate, adding ethylene, polymerizing by means of a water-soluble redox catalyst system, and then adding the polyamine.

The use of such adhesives gives quite satisfactory results as regards resistance to peeling provided that the laminate is not subjected to thermal stress and/or stress as a result of moisture.

OBJECTS OF THE INVENTION

An object of the present invention is to provide an adhesive which, when used, results in laminates or coated shaped articles having a bond of improved strength, especially also during and after thermal stress and, in many cases, even during and after stress caused by boiling water.

Another object of the present invention is the development of a laminating and coating adhesive in aqueous dispersion form consisting essentially of:

(1) an aqueous dispersion of a copolymer of monomer units selected from the group consisting of:

(a) a vinyl ester of an alkanoic acid having from 1 to 18 carbon atoms, (b) an acrylic acid ester of an alkanol having from 1 to 18 carbon atoms, and (c) mixtures thereof, with (d) from 0.1% to 10% by weight, based on the total monomer content of an ethylenically-unsaturated functional group-containing monomer having from 3 to 18 carbon atoms, and hydroxyl and carbonyl groups as functional groups, and (e) from 0 to 55% of other monomers copolymerizable with components (a), (b), (c) and (d), (2) from 0.05% to 20% by weight, based on the copolymer weight, of an epoxy compound having at least one epoxy group per molecule and having a mean epoxy equivalent weight of from 80 to 1,000, (3) from 0.05% to 20% by weight, based on the copolymer weight, of an amine hardener, and (4) from 0 to 15%, based on the solids content of the adhesive, of other conventional adhesive additives.

A yet further object of the present invention is the improvement in the process for coating comprising applying an aqueous adhesive dispersion to a solid substrate, drying and recovering a solid substrate coated with an adhesive coating, the improvement consisting essentially of employing a laminating and coating adhesive in aqueous dispersion form consisting essentially of:

(1) an aqueous dispersion of a copolymer of monomer units selected from the group consisting of:

(a) a vinyl ester of an alkanoic acid having from 1 to 18 carbon atoms, (b) an acrylic acid ester of an alkanol having from 1 to 18 carbon atoms, and (c) mixtures thereof, with (d) from 0.1% to 10% by weight, based on the total monomer content of an ethylenically-unsaturated functional group-containing monomer having from 3 to 18 carbon atoms, and hydroxyl and carbonyl groups as functional groups, and (e) from 0 to 55% of other monomers copolymerizable with components (a), (b), (c) and (d), (2) from 0.05% to 20% by weight, based on the copolymer weight, of an epoxy compound having at least one epoxy group per molecule and having a mean epoxy equivalent weight of from 80 to 1,000, (3) from 0.05% to 20% by weight, based on the copolymer weight, of an amine hardener, and (4) from 0 to 15%, based on the solids content of the adhesive, of other conventional adhesive additives, as said aqueous adhesive dispersion.

These and other objects of the invention will become more apparent as the description thereof proceeds.

DESCRIPTION OF THE INVENTION

The above objects have been achieved and the drawbacks of the prior art have been overcome by the present invention, by which, surprisingly, it is possible even to achieve such strengths of adhesion that attempts to break the adhesion by mechanical means cause destruction of the cemented layers of the laminate or of the coated shaped article.

The subject of the invention is a laminating and coating adhesive consisting of:

(1) an aqueous dispersion of a copolymer comprising monomer units of a vinyl ester of an alkanecarboxylic acid having from 1 to approximately 18 carbon atoms, or of an acrylic acid ester of an alkanol having from 1 to approximately 18 carbon atoms, or a mixture of those monomers, and at least one further monomer, (2) from 0.05% to 20% by weight of an epoxy compound having at least one epoxy group per molecule and having a mean epoxy equivalent weight of from 80 to 1,000, (3) from 0.05% to 20% by weight of an amine hardener, the amounts in each case being based on the weight of the copolymers, and (4) optionally, further additives, which are characterized in that the copolymer of the dispersion (a) additionally contains from 0.1% to 10% by weight, based on the total weight of the copolymer, of monomer units, introduced by polymerization of an ethylenically-unsaturated functional group-containing monomer having hydroxyl and carbonyl radicals as functional groups, and from 3 to 18 carbon atoms.

More particularly, the present invention relates to a laminating and coating adhesive in aqueous dispersion form consisting essentially of:

(1) an aqueous dispersion of a copolymer of monomer units selected from the group consisting of:

(a) a vinyl ester of an alkanoic acid having from 1 to 18 carbon atoms, (b) an acrylic acid ester of an alkanol having from 1 to 18 carbon atoms, and (c) mixtures thereof, with (d) from 0.1% to 10% by weight, based on the total monomer content of an ethylenically-unsaturated functional group-containing monomer having from 3 to 18 carbon atoms, and hydroxyl and carbonyl groups as functional groups, and (e) from 0 to 55% of other monomers copolymerizable with components (a), (b), (c) and (d), (2) from 0.05% to 20% by weight, based on the copolymer weight, of an epoxy compound having at least one epoxy group per molecule and having a mean epoxy equivalent weight of from 80 to 1,000, (3) from 0.05% to 20% by weight, based on the copolymer weight, of an amine hardener, and (4) from 0 to 15%, based on the solids content of the adhesive, of other conventional adhesive additives; and its use in coating and laminating.

The adhesive is preferably produced by, on the one hand, adding from 0.1 % to 40% by weight, based on the copolymer, of an epoxy compound of the above-defined kind and, optionally, further additives, to 1 part by weight of the copolymer dispersion (1) and, on the other hand, adding from 0.1 % to 40% by weight, based on the copolymer, of an amine hardener and, optionally, further additives, to 0.7 to 1.3 parts by weight of the copolymer dispersion (1), and then homogeneously mixing together the components so obtained.

The adhesives according to the invention are excellently suitable for the manufacture of laminates of sheetlike structures or shaped articles comprising one or more of the following materials: Polyolefins, polyesters, polyamides, vinyl and vinylidene polymers, and modified cellulose.

Included among the materials mentioned, there are obviously also to be understood those that contain mixtures of the said substances, i.e., blends of, for example, a polyamide and a polyester, and also copolymers and graft copolymers consisting of monomer units selected from the group of α-olefins, for example, ethylene; vinyl and vinylidene halides, for example, vinyl chloride and vinylidene chloride; vinyl esters, for example, vinyl acetate, vinyl propionate and vinyl laurate; and α,β-ethylenically unsaturated carboxylic acids.

Furthermore, the adhesives according to the invention may advantageously be used when coating paper, cardboard or metal, for example, aluminum and tin, with sheetlike structures consisting of the aforementioned materials.

The aforementioned materials, apart from paper and paste board (cardboard), are especially preferably used as sheetlike structures, especially sheets or foils.

The aqueous dispersion (1) is preferably produced by copolymerizing a vinyl ester of a straight-chain or branched, preferably saturated, monocarboxylic acid having from 1 to approximately 18 carbon atoms, or an acrylic acid ester of an alkanol having from 1 to approximately 18 carbon atoms, or a mixture of those monomers, with approximately 0.1% to approximately 10% by weight, based on the total monomers of an ethylenically-saturated functional group-containing monomer that has from 3 to 18 carbon atoms and contains hydroxyl and carbonyl groups as functional groups, and optionally, with further monomers, in the presence of customary protective colloids and/or emulsifiers as well as preferably water-soluble initiator systems. It is also possible to add the epoxy compounds prior to, at the beginning of, or during, polymerization. Preferably, however, those compounds are not admixed until polymerization is complete.

The ethylenically-unsaturated functional group-containing monomers that contain hydroxyl and carbonyl groups as functional groups can be of diverse types. Preferably the hydroxyl and carbonyl groups are arranged in the molecule in such manner as to give rise to an activated hydrogen capable of undergoing reaction with an amine and/or epoxide group. In particular, the hydroxyl and carbonyl group can be combined as a carboxyl group or be closely adjacent each other as an N-methylolamide group. Especially preferred as functional group containing monomers are compounds of the formula $$CH_2{=}CH{-}CO{-}XH$$

and $$CH_3{-}CH{=}CH{-}CO{-}XH$$

where X is —O— or —$NHCH_2O$. Among the monomers which can be employed under the above designation are alkenoic acids having from 3 to 18 carbon atoms, preferably from 3 to 8 carbon atoms, such as acrylic acid, methacrylic acid, crotonic acid, etc.; alkenedioic acids having from 4 to 18 carbon atoms, preferably from 4 to 8 carbon atoms, such as maleic acid, fumaric acid, itaconic acid, etc.; and N-methylolamides of the above alkenoic acids and alkenedioic acids, such as N-methylolacrylamide or N-metliylolmethacrylamide, or mixtures of those compounds. The mentioned methylol compounds are especially preferred.

The following come into consideration as optional further monomers to be employed in amounts of from 0 to 55% by weight of the monomers, for the manufacture of the copolymers: α-olefins, especially 1-alkenes having from 2 to 4 carbon atoms, for example, ethylene and propylene; methacrylic acid esters of alkanols having from 1 to approximately 18 carbon atoms, especially, for example, methyl methacrylate, ethyl methacrylate and butyl methacrylate; amides of acrylic and methacrylic acid, optionally substituted by lower alkyl groups, for example, acrylamide, methacrylamide, N-methylacrylamide, N-methylmetbacrylamide, N,N-dimethylacrylamide, N,N-dimethylmethacrylamide, N-ethylacrylamide, N-ethylmethaerylamide, N,N-diethylacrylamide and N,N-diethylmethacrylamide; acrylonitrile, methacrylonitrile, lower alkyl esters of fumaric and maleic acid, for example, dibutyl maleate; and N-vinylpyrrolidone. Ethylene is especially preferably used.

The copolymer dispersions used in accordance with the invention are produced according to known polymerization processes, preferably by emulsion polymerization, preferably with solids contents of from 3% to 70% by weight based on the total weight of the copolymer dispersion.

The epoxy compound is admixed with a portion of dispersion (1). The epoxy compounds are, for example, those based on epichlorohydrin-bisphenol A, glycidyl ethers of alkanepolyols, epoxypropylamines, novolak epoxy compounds, cycloaliphatic resins with epoxy groups, for example, dicyclopentadienyldioxide, diglycidyl esters of hexahydrophthalic acid, vinylcyclohexenedioxide, and epoxy compounds of alkylphenols or of fatty acid derivatives. In general, they have epoxy equivalent weights of from 80 to 1,000 and preferably they have viscosities of 0.2 to 40 Pa.s at 25° C. They are readily available commercially. The epoxy compounds can be used as such, but it is also possible first to disperse them in water and then use those dispersions. The epoxy compound is added to the portion of dispersion (1), preferably in amounts of from 5% to 30% by weight, based on the copolymer.

The amine hardener is added to another portion of dispersion (1), preferably in amounts of from 5% to 30% by weight, based on the copolymer. The amine hardeners generally comprise amines and/or amides, but frequently also polyamines and/or polyamides. They are likewise readily available commercially. Examples are aliphatic polyamines, their derivatives and salts, for example, diethylenetriamine, triethylenetetramine, dimethylaminopropylamine, ethylenediamine; adducts of those compounds with monofunctional or polyfunctional glycidyl ethers, for example, of bisphenol A or of butylglycidyl ethers; reaction products of those compounds with ethylene oxide, propylene oxide or acrylonitrile; aromatic amines, for example, m-phenylenediamine, 4,4'-methylenedianiline,. 4,4'diaminodiphenylsulfone; secondary and tertiary aliphatic amines and salts thereof, for example, piperidine, benzyldimethylamine, dimethylaminomethyl phenol; polyaminoimidazolines; polyaminoamides, for example, resinous condensation products of oligomerized vegetable oils, for example, tall oils, or unsaturated fatty acids with arylpolyamines or alkylpolyamines.

The two dispersions, one of which contains the epoxy compound while the other contains the hardener, are then mixed together in a ratio of approximately 1:0.7 to 1:1.3 to form the reactive adhesive according to the invention. Preferably the ratio of epoxy compound to hardener is in that case in the range of from 1:1 to 400:1, especially from 1:1 to 25:1.

In many cases, a ratio of 1:1 has proved to give optimal results. To achieve special effects the amine hardener can, if desired, be used in excess with respect to the epoxy compound.

The adhesive so obtained generally has a pot life of from a few hours to approximately two weeks. The desired pot life can easily be adjusted by the expert, if necessary, after a few tests.

The adhesive so obtained can be used as such or alternatively can be mixed with further additives. The further additives are conventional adhesive additives employed in an amount of from 0 to 15% by weight, based on the solids content of the adhesive. It is frequently desirable to set specific viscosities, for example, by the addition of water or a filler. The optimal viscosities depend on the nature of the intended processes. Thus, adhesive dispersions having viscosities of approximately 10 to 500 mPa.s have proved especially advantageous for application by means of rollers, for example, also in reverse roll coating, intaglio printing or air brush. For application by doctor blade apparatus, adhesives according to the invention having viscosities of up to 5,000 mPa.s are especially advantageous.

Obviously, the two components consisting of copolymer dispersion and epoxy compound, and copolymer dispersion and amine hardener, can be produced from two different copolymer dispersions. It is generally preferred, however, to divide a dispersion into approximately equal parts and add epoxy compound and hardener respectively. At the same time or afterwards, it is also possible to add further additives to these two components, if that is desired in order to achieve special effects.

Examples of such further additives are fillers, for example, finely divided silica, carbon black or plastics powder; dyestuffs; thixotropizing agents; plasticizers; and dispersions auxiliaries. Preferably, however, the addition is limited to up to 10% by weight, based on the solids content of the adhesive. In particular, no fillers or pigments should be added if translucent to clearly transparent laminates are to be produced.

The laminating and coating adhesives according to the invention are generally applied to the sheetlike structure or shaped article, especially to foils, by roller application, air brush, intaglio printing, doctor blade apparatus or by spraying. In some cases it has proved advantageous to pretreat the surface to be coated, for example, by corona discharge, ozonization, or primer supplement, the latter especially in the case of metals or the like. Generally, a wet film thickness of the adhesive of from 10 to 30 $\mu$m is adequate. The layer of dispersion is then dried by convection of hot gases, for example, hot air, by infrared, by high frequency or by some other customary drying process. The sheetlike structure or shaped article is then laminated at temperatures, preferably of between 60° and 100° C., frequently at pressures of approximately 10 to approximately 1,000 kN/m$^2$ to the sheetlike structure(s) (shaped articles) provided as the other layer(s) of the laminate. In an especially preferred embodiment, a sheet of the initially mentioned materials is joined in this manner with another sheet which may differ in material from the other.

In a further preferred embodiment, paper, paste board (cardboard) or metal, the latter preferably likewise in the form of a sheet or foil, is laminated with a sheet of the plastic or modified cellulose materials listed previously by means of the adhesive according to the invention.

In comparison with the state of the art, the laminates or coated products produced using the adhesive according to the invention surprisingly exhibit increased strength especially during and after optionally more prolonged heat action and the action of water. Thus, in contrast with laminates produced according to previous processes, these products are in many cases even resistant to sterilization. Frequently the constraints for thermal mechanical and chemical stress are set, not by the strength of the adhesion, but by the strength of the sheetlike structures or shaped articles bonded by means of the laminating and coating adhesive according to the invention.

The following examples are illustrative of the practice of the invention without being limitative.

EXAMPLES

In the following comparison tests and examples, the adhesive dispersions were applied with a wet film thickness of approximately 12 μm to an approximately 60 μm thick polyethylene foil over a width of 2 cm, dried by hot air (approximately 80° to 90° C.) and then sealed at approximately 90° C. for one second at 392.3 kN/m$^2$ to a second polyethylene foil. After the storage time and storage conditions stated, in each case the two sheets were drawn apart at a speed of 300 mm/min and an angle of 180° over a length of 15 cm. The force required for this was measured in newtons and is quoted as a measure of the resistance to peeling.

EXAMPLE 1

18 parts by weight of an aqueous emulsion containing 50% by weight, based on the total weight of the emulsion, of an epoxy resin having an epoxy equivalent weight of 178 to 196, an epoxy value of 0.51 to 0.56 and a viscosity of 25° of 6 to 10 Pa.s, were added to 100 parts by weight of an aqueous dispersion of a copolymer consisting of 52% by weight of vinyl acetate units, 6% by weight of butyl acrylate units, 39% by weight of ethylene units and 3% by weight of N-methylolacrylamide units, and having a solids content of 45% by weight. The total solids content of the dispersion produced in this manner was then adjusted, with water, to 40% by weight.

18 Parts by weight of a 50% by weight solution of a customary commercial polyaminoimidazoline resin in dilute acetic acid were added to a further 100 parts by weight of the same copolymer dispersion, and the solids content was then likewise adjusted to 40% by weight.

The polyaminoimidazoline resin, in the form of a 75% by weight solution in dilute acetic acid had a viscosity of 10 to 20 Pa.s at 25° C. and an amine number of 210 to 240.

The two modified copolymer dispersions were mixed with one another and applied to a 60 μm thick polyethylene foil in such an amount that each M$^2$ of sheet was coated with approximately 5 gm of dry adhesive composition. After drying with hot air at 80° C. to 90° C., it was sealed to an identical polyethylene foil.

The following resistance to peeling were ascertained:

| Test | Storage Time | Storage Conditions | Force (N) to Peel |
|---|---|---|---|
| (a) | 2 hours | 23° C., 50% relative atmospheric humidity | 3.0–3.5 |
| (b) | 30 minutes 1 hour | Boiling water, then cold water (approximately 10° C.) | 6.5–7.0 |
| (c) | 7 days | 40° C., 30% relative atmospheric humidity | About 7 |
| (d) | 7 days | 40° C., 30% relative atmospheric humidity, then | 8.0–8.5 |
| | 30 minutes 1 hour | Boiling water then cold water (approximately 10° C.) | |

EXAMPLE 2

Example 1 was repeated, except that the dispersion had a 45% by weight solids content and contained a copolymer consisting of 61% by weight of vinyl acetate units, 7% by weight of butyl acrylate units, 29% by weight of ethylene units and 3% by weight of N-methylolacrylamide units.

The following resistance and peeling measurements were ascertained:

| Test According to Example 1 | Peeling Force (N) |
|---|---|
| (a) | 9.5–10.0 |
| (b) | 9.5–10.0 |
| (c) | Sheet torn |
| (d) | Sheet torn |

COMPARISON TEST

Example 1 was repeated, except that an aqueous dispersion having a 45% by weight solids content of a copolymer consisting of 78% by weight of vinyl acetate and 22% by weight of ethylene was used.

Storage analogously to the Tests (a) and (c) in Example 1 in each resulted in peeling resistance of 3 to 3.5 N.

In Tests (b) and (d) according to Example 1, practically no resistance to peeling could be ascertained.

EXAMPLE 3

Example 1 was repeated, except that the starting dispersion had a solids content of 65% and contained a copolymer consisting of 96% by weight of ethyl acrylate and 4% by weight of N-methylolacrylamide units.

The following resistance to peeling measurements were taken:

| Test According to Example 1 | Peeling Force (N) |
|---|---|
| (a) | 10.0–10.5 |
| (b) | 8.0–9.0 |
| (c) | 12.5–13.0 |
| (d) | 12.0–12.5 |

EXAMPLE 4

Example 1 was repeated, except that the starting dispersion had a solids content of 50% and contained a copolymer consisting of 87% by weight of vinylacetate, 12% by weight of ethylene and 1% by weight of acrylic acid.

The best samples were prepared according example 1. Storage at normclimate (23° C., 50% rh) resulted in the peeling resistance of 10–11 N/2 cm after 15 min., 30 min., 60 min., 2 hours and 7 hours of storage time. After 24 hours of storage time the sheet was torn.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A laminating and coating adhesive in aqueous dispersion form comprising:

(1) an aqueous dispersion of a copolymer of monomer units selected from the group consisting of:

(a) a vinyl ester of an alkanoic acid having from 1 to 18 carbon atoms, (b) an acrylic acid ester of an alkanol having from 1 to 18 carbon atoms, and (c) mixtures thereof, with (d) from 0.1% to 10% by weight, based on the total monomer content of an ethylenically-unsaturated functional group-containing monomer having hydroxyl and carbonyl groups as functional groups selected from the group consisting of [alkenoic acids having from 3 to 8 carbon atoms, alkenedioic acids having from 4 to 8 carbon atoms, N-methylolamides of said alkenoic acids and N-methylolamides and di-N-methylolamides of said alkenedioic acids,] *N-methylolacrylamide and N-methylolmethacrylamide,*

(e) from 0 to 55% of other monomers copolymerizable with components (a), (b), (c) and (d), and (2) from 0.05% to 20% by weight, based on the copolymer weight, of an epoxy compound having at least one epoxy group per molecule and having a means epoxy equivalent weight of from 80 to 1,000, said epoxy compound being added after completion of copolymerization, and (3) from 0.05% to 20% by weight, based on the copolymer weight, of a polyamide hardener, said polyamide hardener being added after completion of copolymerization, said laminating and coating adhesive being capable of laminating at temperatures of between 60° and 100° C.

[2. The laminating and coating adhesive of claim 1 containing up to 15%, based on the solids content of the adhesive, of conventional adhesive additives selected from the group consisting of fillers, dyestuffs, thixotropizing agents, plasticizers and dispersion auxiliaries.]

[3. The laminating and coating adhesive of claim 1 wherein said ethylenically-unsaturated functional group-containing monomer is selected from the group consisting of N-methylolacrylamide and N-methylolmethacrylamide.]

4. The laminating and coating adhesive of claim 1 [or 3] wherein components (2) and (3) are present in an amount of from 2.5% to 15% by weight, based on the copolymer weight.

5. A process for the production of the laminating and coating adhesive of claim 1 consisting of:

(A) mixing from 0.1% to 40% by weight, based on the copolymer weight, of said epoxy compound with 1 part by weight of said dispersion (1) after completion of copolymerization, (B) mixing from 0.1% by 450% by weight, based on the copolymer weight, of said polyamine hardener, with from 0.7 to 1.3 parts by weight of said dispersion (1) after completion of copolymerization, (C) homogeneously mixing (A) and (B) together, and (D) recovering said laminating and coating adhesive.

6. In the process for coating comprising applying an aqueous adhesive dispersion to a solid substrate, drying and recovering a solid substrate coated with an adhesive coating, the improvement consisting essentially of employing a laminating and coating adhesive in aqueous dispersion form comprising:

(1) an aqueous dispersion of a copolymer of monomer units selected from the group consisting of:

(a) a vinyl ester of an alkanoic acid having from 1 to 18 carbon atoms, (b) an acrylic acid ester of an alkanol having from 1 to 18 carbon atoms, and (c) mixtures thereof, with (d) from 0.1% to 10% by weight, based on the total monomer content of an ethylenically-unsaturated functional group-containing monomer having hydroxyl and carbonyl groups as functional groups selected from the group consisting of [alkenoic acids having from 3 to 8 carbon atoms, alkenedioic acids having from 4 to 8 carbon atoms, N-methylolamides of said alkenoic acids and N-methylolamides and di-N-methylolamides of said alkenedioic acids,] *N-methylolacrylamide and N-methylolmethacrylamide,* and (e) from 0 to 55% of other monomers copolymerizable with components (a), (b), (c) and (d), (2) from 0.05% to 20% by weight, based on the copolymer weight, of an epoxy compound having at least one epoxy group per molecule and having a mean epoxy equivalent weight of from 80 to 1,000, said epoxy compound being added after completion of copolymerization, and (3) from 0.05% to 20% by weight, based on the copolymer weight, of a polyamide hardener, said polyamide hardener being added after completion of copolymerization, said laminating and coating adhesive being capable of laminating at temperatures of between 60° and 100° C.

[7. The process of coating of claim 6 wherein said solid substrate coated with an adhesive coating is laminated with a sheetlike structure.]

8. The process of claim [7] *6* wherein said *solid substrate with an adhesive coating is laminated with a* sheetlike structure [is] *made of a material* selected from the group consisting of polyolefin, polyester, polyamide, vinyl polymers, vinylidene polymers, modified cellulose and mixtures thereof.

9. The process of claim [7] *6* wherein said solid substrate is selected from the group consisting of paper, card-board and metal and said sheetlike structure is selected from the group consisting of polyolefin, polyester, polyamide, vinyl polymers, vinylidene polymers, modified cellulose and mixtures thereof.

10. The laminating and coating adhesive of claim 1 wherein said ethylenically-unsaturated functional group-containing monomer is a compound having the formulae $$CH_2{=}CH{-}CO{-}XH$$

and $$CH_3{-}CH{=}CH{-}CO{-}XH$$

wherein X is a member selected from the group consisting of —O— and —$NHCH_2O$—.

11. The laminating and coating adhesive of claim 1 [or 3] wherein said other monomers of component (1)(e) are members selected from the group consisting of 1-alkenes having from 2 to 4 carbon atoms, methacrylic acid esters of alkanols having from 1 to 18 carbon atoms, amides of acrylic acid and methacrylic acid optionally substituted by lower alkyl, acrylonitrile, methacrylonitrile, lower alkyl esters of fumaric and maleic acid and N-vinylpyrrolidone.

12. The laminating and coating adhesive of claim 1 [or 3] wherein said epoxy compound of component (2) has a viscosity of from 0.2 to 40 Pa.s at 25° C.

13. The process for coating of claim [7] *6* wherein said solid substrate coated with an adhesive coating is a sheetlike structure.

14. The process for coating of claim [7] *6* wherein said sheetlike structure and said solid substrate of claim [7] *6* which are laminated are foils and the laminated foils are resistant to sterilization.

* * * * *